United States Patent [19]
Culp

[11] Patent Number: 4,821,129
[45] Date of Patent: Apr. 11, 1989

[54] TAPE POSITIONING USING REVERSE BOUNDARY CAPTURE: TAPE DRIVE SYSTEM AND METHOD

[75] Inventor: Bradfred W. Culp, Greeley, Colo.

[73] Assignee: Hewlett-Packard Company, Palo Alto, Calif.

[21] Appl. No.: 933,650

[22] Filed: Nov. 21, 1986

[51] Int. Cl.⁴ .............................................. G11B 15/48
[52] U.S. Cl. .................................. 360/74.4; 360/72.3; 360/74.1
[58] Field of Search .................. 360/74.4, 74.1, 48–50, 360/72.1, 72.2, 72.3

[56] References Cited

U.S. PATENT DOCUMENTS

| | | | |
|---|---|---|---|
| 3,938,105 | 2/1976 | Lechner | 360/48 |
| 4,542,427 | 9/1985 | Nagai | 360/74.4 |
| 4,551,774 | 11/1985 | Sakaguchi et al. | 360/74.4 |
| 4,680,652 | 7/1987 | Ito | 360/74.4 |

FOREIGN PATENT DOCUMENTS

0040108 3/1977 Japan .................................. 360/74.4

Primary Examiner—John H. Wolff
Assistant Examiner—David J. Severin
Attorney, Agent, or Firm—Guy J. Kelley; Jeffery B. Fromm

[57] ABSTRACT

A tape driven system includes means for capturing data block boundaries while moving in reverse, as well as in the forward direction. Thus, block boundaries can be captured following each reversal of tape direction to cancel prior errors induced during tape reversals provided these errors are within tolerance. In a hitch operation, the rear boundary of a data block is recaptured as a reference position for the next forward operation. In a backspace operation, the front boundary of a data block is captured while the tape is moving in the reverse direction to provide a reference point for the next operation.

19 Claims, 5 Drawing Sheets

TAPE POSITIONING USING REVERSE BOUNDARY CAPTURE: TAPE DRIVE SYSTEM AND METHOD

BACKGROUND OF THE INVENTION

The present invention relates to tape positioning in the context of tape drive systems. The invention has particular applicability to streaming tape drive systems using a magnetic tape medium, while providing for other applications.

Streaming tape drive systems are designed for the rapid storage and retrieval of bulk data in conjunction with a host computer. Typically, data is stored in the form of a series of blocks of magnetic flux activity on a magnetic tape medium, the blocks being spaced by inter-block gaps with nominally no magnetic flux activity. In streaming mode, the blocks can be written or read, seriatim, without stopping or reversing the transfer of tape across read/write heads.

There are several situations in which it is required to interrupt the streaming. If, during a read operation, the buffer interface to a host computer becomes full, the read process must be stopped until the buffer can accept more data. If, during a write operation, the buffer becomes empty, reasonable utilization of the tape medium requires that the tape be stopped until the buffer can supply data at a reasonable rate. Also, errors in reading or writing a block can make a re-try necessary.

Generally, after streaming is interrupted, the tape must be repositioned. This repositioning normally requires backward motion of the tape. This is clear when a block containing an error must be reread or rewritten. However, even when all previous blocks have been successfully written or read, backwards motion may be required since, while a streaming tape drive is ramping down to a stop, the next block to be read, or the next region to be erased and written over may have crossed the read and write heads.

Repositioning can be effected by a drive controller which instructs a drive mechanism to stop a forward moving tape, move the tape in a backward direction, and stop the backward motion at a point appropriate for the next forward operation. In determining an appropriate stopping point, the need for ramping the streaming tape drive up to operational speed and then detecting the gap-to-block boundary of the block of interest must be taken into account.

For this repositioning to be effected with any precision, a position indicator can be used. A position indicator can include a bidirectional counter which counts tallies generated by a tape speed sensor. The speed sensor can include a barrel which frictionally engages a tape as it is being transferred across the heads. By way of example, the sensor can have an optically marked element which rotates with the barrel. As the element rotates, the marks can be detected by a sensor and the detections counted by the position indicator. Normally, the counting takes into account the direction of tape transfer, e.g., counting up during forward motion and counting down during rearward motion.

As an illustrative operation, a start-stop read procedure involves reading a block and detecting its rear boundary, which takes the form of a block-to-gap transition. The value of the position indicator at this detection is then stored; this step is referred to as a position capture.

The system can then ramp down to a stop. The position indicator should then indicate a value greater than the stored boundary position value. Rearward motion is begun and continued until the position indicated is sufficiently less than the stored position value that a forward tape speed sufficient for reading can be achieved within the gap following the block just read. Thus, the system is ready to read the next block. This repositioning with respect to the rear boundary of a block to prepare for an operation concerning the following block is referred to as a "hitch" operation.

Another repositioning operation, referred to as a "backspace" operation, is used generally to reread or rewrite a block. Such a retry is generally in response to an error detection. In this case, the rear boundary capture for the previous block can be used as a position reference.

Errors in repositioning can cause the tape drive system to confuse one block for another, seriously impairing performance. Furthermore, repositioning errors impair the system's ability to handle noise in the form of flux activity within gaps and dropouts within blocks, which can impair the determination of whether a block or gap is present.

A major source of such errors is tape slippage relative to the barrel of the speed sensor. Such slippage is most prone to occur during acceleration and acceleration of the tape, and thus especially during reversals of tape direction. Slippage errors are cumulative since the last boundary capture, so that repositioning errors are more likely for complex repositioning procedures.

Another source of error is differential tape stretch, which is routinely caused by tape tension variations as a function of tape direction. Differential tape stretch can cause the segment of tape corresponding to a block of data, or other information unit to have a different length during rearward motion than it does during forward motion. The magnitude of the differential can correlate with the length of segment under consideration.

The effect of position indicator errors is to limit the accuracy of repositionings. To the extent that the errors are systematic, they can be compensated for in advance, for example, by adjusting the calculated value of the point at which repositioning is to be completed. Random errors can be minimized and/or accommodated by design tolerances.

In practice, most repositioning errors are accommodated by specified minimum interblock gap lengths. In other words, a standardized streaming tape drive format such as group code recorded format includes in its specifications a minimum interblock gap length of 0.28". This figure can be used in designing the tolerances of a tape drive system that uses this format.

While the standard minimum interblock gaps ar sufficiently large to accommodate an acceptable percentage of random positioning errors due to isolated tape reversals, the accumulation of errors imposes severe design constraints. For example, in order to minimize the sources of errors, slower speeds and more gentle starts and stops can be used, thereby compromising performance.

In addition, or in the alternative, accumulated errors can be accommodated by increasing the mechanical precision of the tape drive system. However, increases in mechanical precision are expensive. Costs tend to rise geometrically in relation to the precision required. Reliability is also adversely affected by the increased vulnerability of high-precision mechanics to misalignment due to physical shock and temperature variations.

What is needed is a tape drive system and method providing for more accurate repositioning. Procedures involving multiple tape direction reversals need to be handled without requiring concomitant increases in mechanical precision. Errors due to differential tape stretch should also be accommodated effectively. In addition, these errors should be accommodated in such a way as to enhance the ability to distinguish noise from data.

SUMMARY OF THE INVENTION

A tape drive system and method provides for increased precision during repositioning by using block boundary captures made while the a is moving in a rearward direction. This generally allows the errors due to at least one tape direction reversal to be cancelled in a repositioning procedure.

In order to perform a hitch, the rear boundary of a block can be captured while the tape is moving in reverse. This "reverse capture" cancels the effect of prior errors, provided they are within tolerance. Thus, when forward motion is resumed, the position error is fairly restricted to that incurred during the next reversal to forward movement, without the confounding effect of prior reversals.

In a backspace operation, a front boundary gap can be captured while the tape is moving in reverse. The value of the reverse-captured front boundary can be used as the reference for repositioning, cancelling errors due to prior reversals in direction.

In one implementation of the present invention, a tape drive system includes means for capturing front and rear boundaries while the tape is moving forward and while it is moving backwards. These captures can be performed in two independent ways within a single system. In a gap transition approach, transitions in a signal indicating whether a block or gap is present can be used to identify block boundaries. In a boundary marker approach, conventional preambles and postambles can be read and identified in forward or reverse.

A repositioning strategy must address the challenge of ensuring that a captured boundary belongs to the correct block. It is possible for a block to be followed by a very short block which is crossed while the system is ramping down to a stop. Without precautions, the rear boundary of the second block could be captured and mistaken for the rear boundary of the intended block.

Accordingly, during the forward motion of the tape, the rear boundary of the subject block can be captured, effectively cancelling accumulated position errors. The subsequent gap is then checked to confirm that its length meets the required minimum. After ramping down to a stop, the tape direction is reversed. At first, boundary capture is inhibited so that rear boundaries of any small adjacent blocks cannot be confused with the rear boundary of the subject block.

A capture mode is activated only when the value of the position indicator represents a point which must be within the gap adjacent the rear boundary assuming any errors induced since the forward capture of the boundary of interest are within tolerance. For example, the capture mode might be activated as the position indicator attains a value corresponding to the rear boundary as captured in the forward direction plus an offset representing one half the length of a minimum sized gap.

This ensures that the next detection of a block boundary is the rear boundary of interest.

In either a hitch operation or a backspace operation, the first reverse capture following the forward rear boundary capture should be the rear boundary of the subject block about which repositioning is to occur. Errors due to intervening reversal of direction are cancelled by the reverse capture of the rear boundary. In the backspace operation, errors due to differential tape stretch are cancelled by the subsequent reverse capture of the front boundary. Thus, for either operation, at the time forward motion is resumed, error sources are essentially restricted to differential stretch over the ramp up distance and a single tape reversal, since the last rearward capture. These errors can be cancelled by the next forward-going boundary capture.

The forward-captured front boundary position value can be used in conjunction with the subsequent forward-captured rear boundary value to calculate the length of a block. The length of a block can be used to inhibit capture while dropouts are traversed. In other words, when a dropout has been detected while reading a block, this dropout must not be treated as defining a front boundary during a backspace operation. Thus, during the reverse motion of a backspace operation, gap capture can be inhibited until the position indicator value indicates that the block is almost traversed, taking into account the appropriate tolerances.

Thus, in accordance with the present invention, a system and method is presented providing increased repositioning accuracy. This increase in accuracy is primarily due to the cancelling of errors after each major error-prone event. In other words, error accumulation can be minimized as long as individual errors are kept within tolerance. Other advantages and features are apparent from the detailed description below with reference to the following drawings.

DESCRIPTION OF THE PREFERRED EMBODIMENTS

Figure 1:
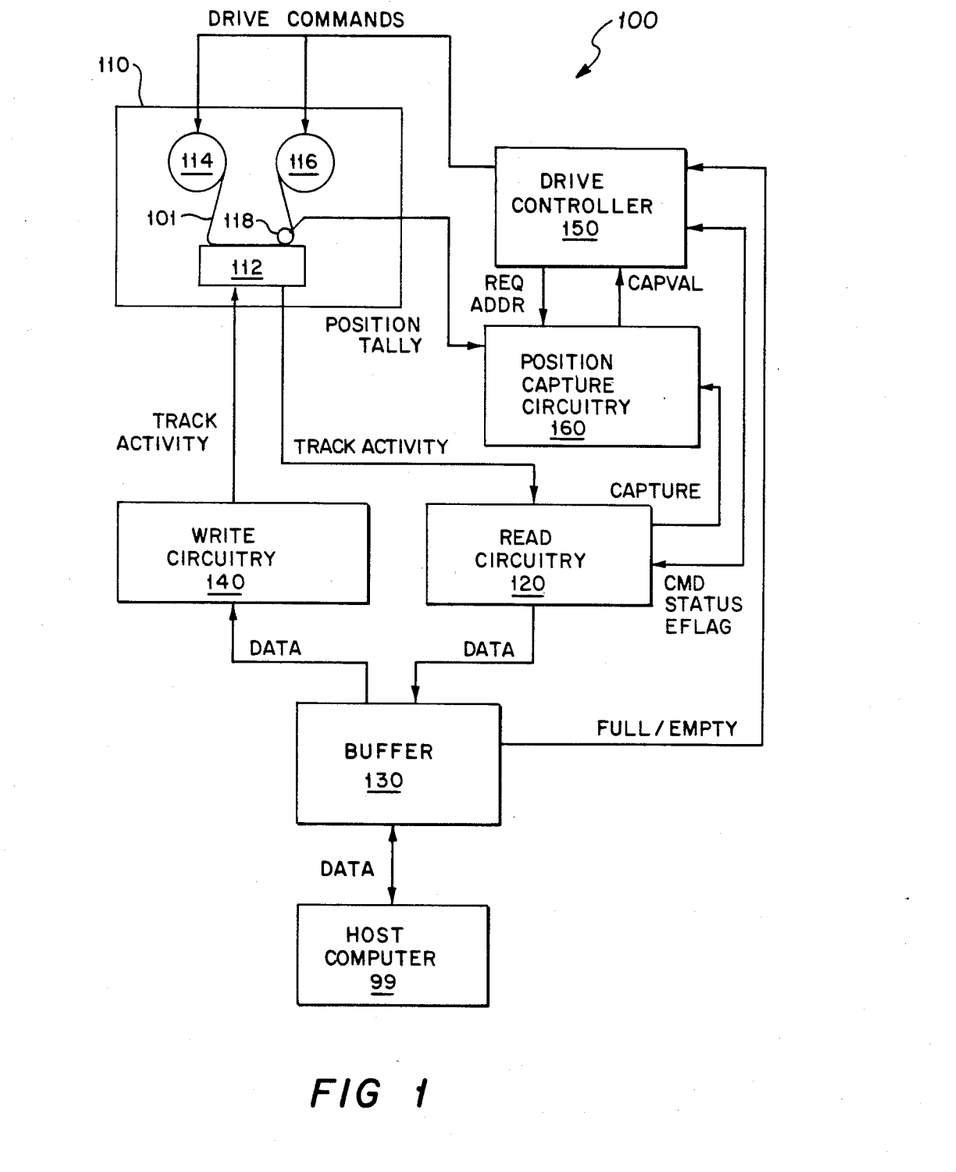
FIG. 1 is a block diagram of a tape drive system in accordance with the present invention.

A tape drive system 100 for storing and retrieving information in connection with a host computer 99 is shown in FIG. 1. The tape drive system 100 includes a drive mechanism 110 for transferring a magnetic medium tape 101 across an included head assembly 112 between a supply reel 114 and a take-up reel 116. As the tape 101 moves, it engages the barrel of a speed sensor 118. In the context of the present invention, the main function of the speed sensor is to provide a position tally for use in determining tape position.

During information retrieval, information stored on the tape 101 as magnetic flux reversals is converted to TRACK ACTIVITY signals in the form of electrical voltage levels as the tape is transferred across a read head of assembly 112. These electrical voltages are processed by read circuitry 120 which converts the information to DATA signals in a form intelligible to the host computer 99. The converted information is transferred to the host computer 99 through an interface buffer 130.

During information storage, information is sent from the host computer 99 through the buffer 130 for encoding by write circuitry 140 of the tape drive system 100. The encoded electrical data is then converted to magnetic flux activity by a write head of assembly 112. This magnetic flux activity is stored on the passing tape 101.

Figure 3:
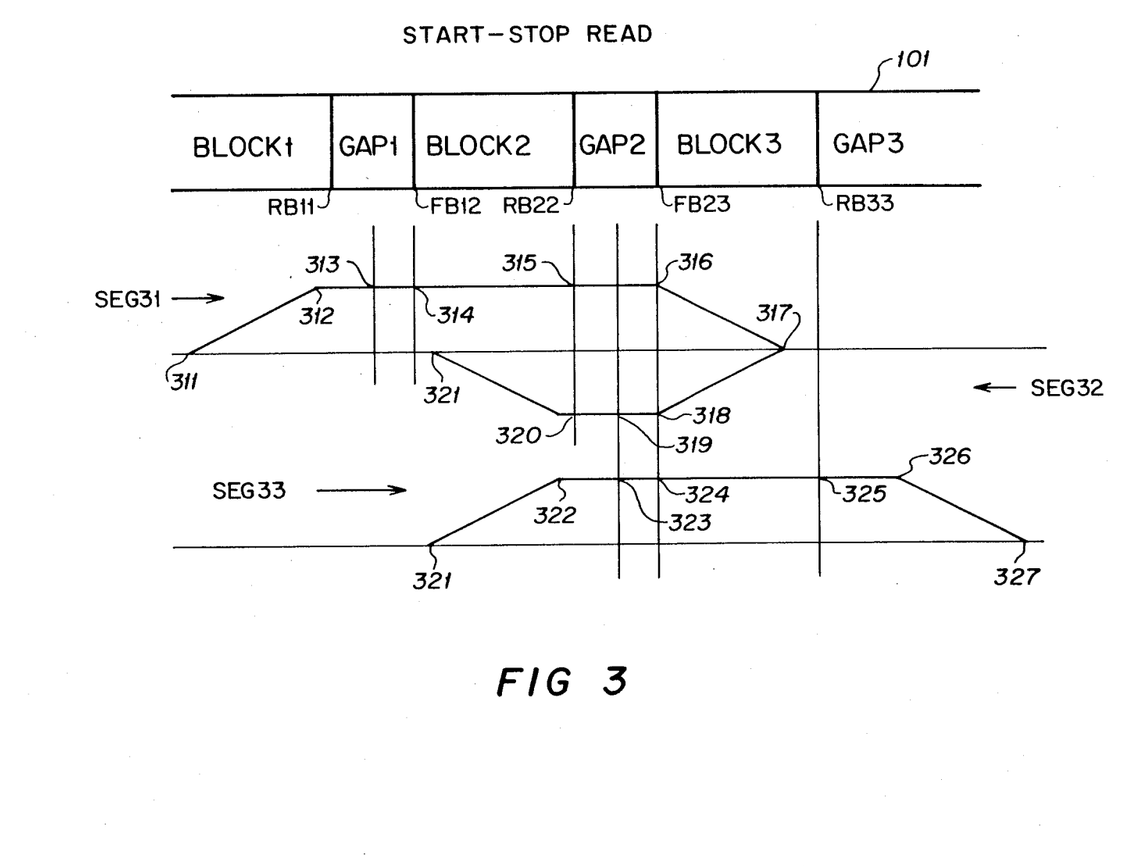
FIG. 3 is a diagrammatic representation of a start-stop read procedure incorporating the present invention.
Figure 4:
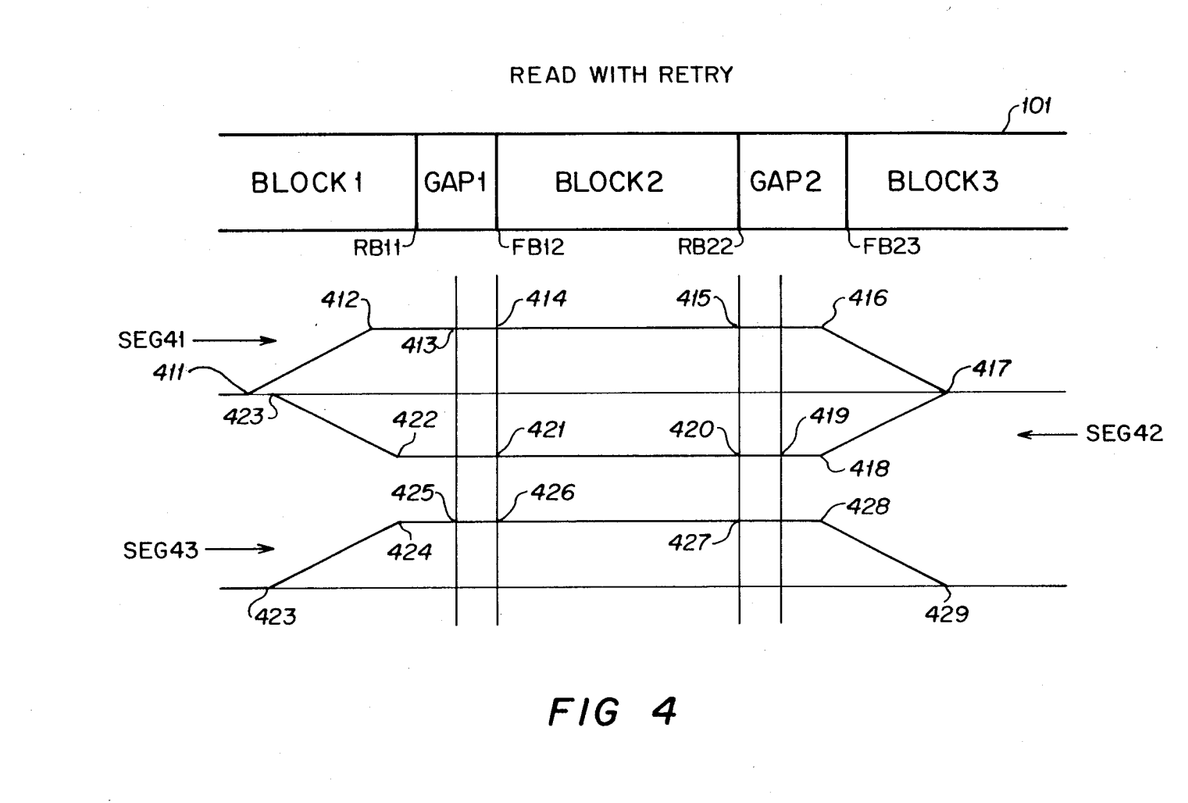
FIG. 4 is a diagrammatic representation of a read with retry procedure incorporating the present invention.
Figure 5:
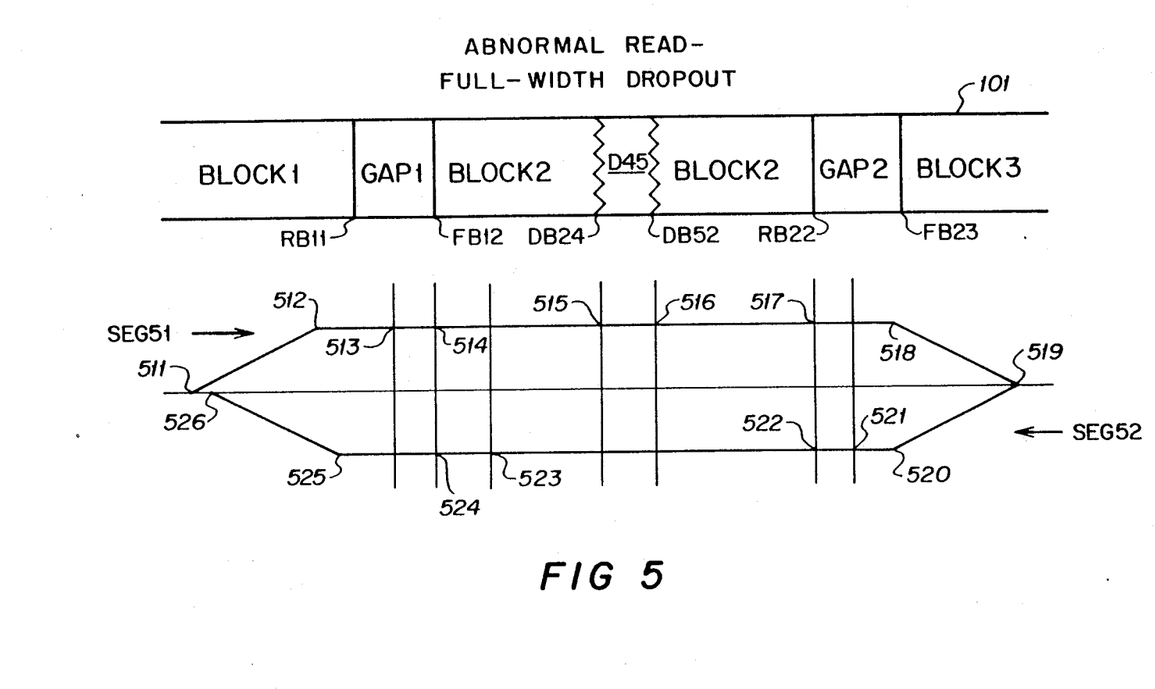
FIG. 5 is a diagrammatic representation of a read of a block having a full width dropout followed by a backspace operation performed in accordance with the present invention.

The write circuitry 140 adds, to the user data from the host computer 99, system data used by the read circuitry 120 to format, check and correct information upon retrieval. Specifically, the write circuitry 140 formats user information into a series of blocks including BLOCK1, BLOCK2, and BLOCK3, separated by interblock gaps, including GAP1, GAP2, GAP3, as shown in FIGS. 3-5. The write head of assembly 112 is upstream of the read head so that the read circuitry 120 can also be in a verify mode in which the tape 101 is read from while it is being written to.

The transfer of the tape 101 across the heads of assembly 112 is regulated according to DRIVE COMMAND signals from a drive controller 150 which controls the starting, stopping, speed and direction of the supply reel 114 and the take-up reel 116. For example, if the buffer becomes full during a read operation, it can flag this condition with a FULL signal to the drive controller 150. The drive controller 150 then can direct the tape drive mechanism 110 to stop the transfer of tape until the host computer 99 has had time to clear some memory in the buffer 130. A similar procedure is followed when the buffer 130 issues an EMPTY signal during a write operation.

Before starting to read or write the next block, the drive controller 150 must manage a hitch operation to take into account ramp down and ramp up times. If during a read or verification, the read circuitry 120 detects an error requiring a retry, the system 100 must backspace over the block in which the error was detected, taking into account ramp-up and ramp-down in determining where to halt reverse motion.

In order for the drive controller 150 to manage precise repositioning during hitch and backspace operations, it must be able to determine the current position of the heads, specifically the read head, relative to a data block of interest. Tape position and direction is determined from the quadrature POSITION TALLY output of the speed sensor 118 as input to position capture circuitry 160. The position capture circuitry 160 includes a bidirectional counter which increments during forward motion tallies and decrements during rearward motion tallies. The speed sensor 118 and the position capture circuitry 160 function together as a position indicator.

When the read circuitry 120 detects a transition from a gap to a block, its CAPTURE output to the position capture circuitry 160 triggers the storage of the current value of the counter in an incorporated register dedicated to gap-to-block position captures. Similarly, a block-to-gap detection can result in a store to a register dedicated to block-to-gap captures. These registers are routinely polled by the drive controller 150 so that it maintains a record of the captured positions of current and recently read blocks. In accordance with the present invention, these captures can be made while the tape is moving in reverse, as well as while the tape is moving forward.

In addition, the read circuitry 120 can recognize preambles and postambles to data blocks. Thus, block boundary captures can be confirmed. For example, a gap-to-block detection without a preamble detection would signal an error or exception. Conveniently, the postamble can be a mirror image of the preamble, so that the same circuitry can be used to confirm reverse block/gap boundary captures. In the alternative, a tape drive system could include circuitry for recognizing preambles and postambles independently in either direction.

Figure 2:
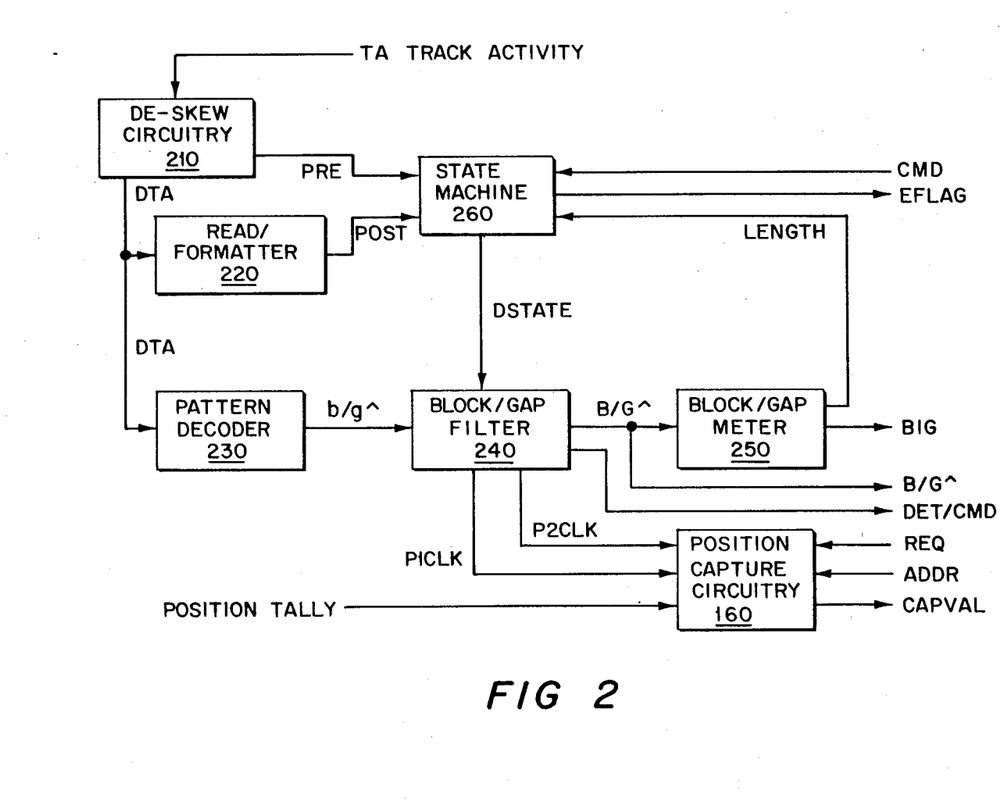
FIG. 2 is a block diagram of sections of the tape drive system of FIG. 1.

The read circuitry 120 includes de-skew circuitry 210, a read formatter 220, a pattern decoder 230, a block/gap filter 240, a block/gap meter 250 and a state machine 260. The latter four components are part of a block detect section which also includes a tape mark detector to handle end-of-file markers, a verify counter to measure the lengths of specialized non-data blocks, and a block type section which makes the final determination as to the type of block being read.

The track activity data TA from the read head is digitized and input to the de-skew circuitry 210. The de-skew circuitry 210 corrects timing misalignments in parallel channels of electrical data, corresponding to the parallel tracks of flux activity, according to the format for storing information on the tape 101. The parallel channels are de-skewed by aligning preambles in the respective data blocks. Thus, both de-skewed track activity data DTA and a preamble detection signal PRE are provided by the de-skew circuitry 210. When the tape 101 is read in the reverse direction, the PRE signal actually indicates the detection of a postamble.

The postamble is used in the forward direction to indicate that a block is completed. Normally, the read formatter 220 detects the postamble as it is reading a block. When a postamble is detected, a POST signal is provided by the read/formatter 220. When the tape 101 is read in reverse, the POST signal can be used to indicate a preamble detection.

The pattern decoder 230 examines the de-skewed track activity signals DTA to make pattern determinations on an instantaneous basis. In other words, erasure in all tracks is used to indicate a gap, so the instantaneous block/gap pattern signal b/g⁻ goes low. Otherwise, b/g⁻ is high. While b/g⁻ is high, the pattern decoder can make other pattern detections to identify tape marks, tape format identification marks, and other specialized marks for use by unillustrated components of the block detect circuitry.

The b/g⁻ signal is examined over time by a block-/gap filter 240 to distinguish noise from actual block or gap determinations. This is done using a counter to threshold consecutive b/g⁻ signals. The result is a block/gap determination signal B/G⁻. The B/G⁻ signal is available to the drive controller 150 to indicate the presence of a block or a gap. This B/G⁻ signal is also directed to a block/gap meter 250 to be measured against predetermined thresholds.

The block/gap meter 250 includes a counter which is reset upon each transition of B/G⁻. One of the thresholds indicated in measuring a gap is the minimum standard length for an interblock gap. This threshold is used in verifying that a detected gap is an interblock gap and that it is large enough for the drive controller 150 to use in positioning operations. A BIG signal is provided to the drive controller 150 to indicate gap verification. Block versus gap determinations, along with other defined thresholds, are encoded and transmitted as a LENGTH signal to the state machine 260.

The state machine 260 progresses through a network of states. The state at any time is a function of the previous state and received inputs. The inputs to the state machine include the PRE signal from the de-skew circuitry 210, the POST signal from the read/formatter 220, the LENGTH signal from the meter 250, and commands CMD from the drive controller 150. The primary commands of interest are a start-up read command to get things moving after a reset, and a stream command to keep things going without stopping.

The main function of the state machine is to provide a detect state output DSTATE which embodies certain sequences of inputs. This DSTATE output can then be used to resolve ambiguous boundary or block-type determinations in favor of probable sequences and against improbable sequences. By implementing the state machine in hardware, these resolutions can be made in real time, enhancing the accuracy of the block detect circuitry. Some of the state transitions indicate errors, which are flagged at the EFLAG output. The illustrated state machine 260 has eighteen states, one of which is a reset state. The remaining states are divided into three sets, each corresponding to a phase in a read cycle. These phases are "pre-detect", "read" and "gap check".

The read phase generally occurs while a block is being read or verified. This phase can be exited when a postamble is indicated by a POST input, or when a timeout such as might be caused by a gap of length at least that of a minimum interblock gap.

The transition is then to a state in the gap check phase. Depending on how this phase was entered, the present gap may or may not need to be verified. In either case, the system can get trapped in a block overrun state of this phase if a block is entered before a stream command is received. In this case, the exit is via a reset command. Otherwise, a stream command causes a transition to a gap verify state of the pre-detect phase. The pre-detect phase can also be entered from the reset state upon either a stream command or a start-up command.

Herein, the major application of the DSTATE output is to suppress a P1CLK signal and a P2CLK signal from the filter 240. The P1CLK signal and P2CLK signal constitute the CAPTURE signals shown in FIG. 1. The P1CLK signal is used to trigger gap-to-block boundary captures, while the P2CLK is used to trigger block-to-gap boundary captures.

This suppression works as follows. During the pre-detect state, P1CLK and follows B/G^ and P2CLK follows B/G^ in inverted form; during the read phase, P1CLK is suppressed, while P2CLK continues to follow B/G^ in inverted form; and during the gap check phase, both P1CLK and P2CLK are suppressed. As indicated below this scheme can be altered for particular situations. The drive controller 150 monitors this suppression as DET is active while P1CLK is suppressed, and CMP is active while P2CLK is suppressed.

The rising edges of P1CLK and P2CLK trigger position value captures by the position capture circuitry 160 to the respective registers. While P1CLK is suppressed, gap-to-block boundary detections cannot result in captures. While P2CLK is suppressed, block-to-gap boundary detections cannot result in a capture. Thus, the state machine governs when block/gap boundaries can be captured.

In particular, a gap-to-block boundary capture temporarily inhibits subsequent gap-to-block boundary captures, and a block-to-gap boundary capture temporarily inhibits subsequent block-to-gap captures until a gap at least as long as a minimum interblock gap is measured. This prevents small dropouts and drop-ins from being captured, wiping out legitimate boundary captures before the drive controller has a chance to store them. Thus, the drive controller has time to request, along line REQ, one or more position captures, as selected along lines ADDR. The requested capture values are forwarded to the drive controller 150 along bus CAP-VAL.

A major feature of these read circuitry 120 is that it can function in either tape direction. When the tape is read in reverse, preambles look like post ambles, and vice-a-versa. P1CLK detects gap-to-block boundaries in either direction; in other words, P1CLK captures front boundaries of blocks during forward tape motion, and rear boundaries of blocks during reverse tape motion. P2CLK detects block-to-gap boundaries in either direction; so again the roles of front and rear boundaries are reversed according to tape direction.

Since the drive controller 150 governs tape direction, it can properly interpret the information it receives from the read circuitry 120 and the position capture circuitry 160. This system 100 can thus employ reverse as well as forward position tape captures in performing positioning procedures and operations.

A start-stop read procedure incorporating a hitch operation in accordance with the present invention is illustrated in FIG. 3. In the diagram, the forward motion of the tape 101 is to the left. However, the representation below is of the read head motion relative to the tape, the relative forward motion of the head being to the right.

The tape 101 is magnetic media tape with a series of encoded blocks of data, including blocks BLOCK1, BLOCK2, and BLOCK3, stored thereon in the form of flux reversals. The blocks are separated by interblock gaps including gaps GAP1, GAP2 and GAP3. These blocks and gaps define front and rear boundaries for the blocks, including front boundaries FB12 and FB23 and rear boundaries RB11, RB22 and RB33.

The purpose of the start-stop read procedure is to permit the reading of blocks one at a time, with the time between the readings of successive blocks being greater than that available under a streaming read. A start stop read could be used when the buffer 130 to the host computer 99 is full so that streaming retrieval of information cannot be managed.

The illustrated start-stop read procedure is shown comprising three segments, a BLOCK2 read segment SEG31, a hitch segment SEG32 and a BLOCK3 read segment SEG33. The procedure begins with a ramp-up from a position 311. Sufficient speed for reading is achieved by position 312 which is in front of GAP1, so that read and detect functions are available as the rear boundary RB11 of BLOCK1 is crossed and GAP1 is entered. At position 313, near the middle of GAP1, a capture mode is activated. In other words, P1CLK and P2CLK are allowed to follow B/G .

A gap-to-block capture is made at position 314 so that the front boundary FB12 of BLOCK2 is available as a reference position. That the captured value represents the front of a data block rather than noise or a specialized mark can be confirmed by the detection of a preamble. This confirmation is performed by the state machine 260 using the PRE input. In other words, the state machine 260 enters different states according to whether a capture is confirmed or not. Upon a confirmed capture, P1CLK is suppressed, inhibiting further gap-to-block captures.

The contents of the data block are decoded for transmission to the host computer 99. At the completion of this reading, the next block-to-gap detection at 315 results in the capture of the rear boundary RB22 of BLOCK2. The POST input to the state machine 260 can be used to confirm that the capture was of a legitimate block boundary.

GAP2 is then measured to verify that its length is at least the predetermined minimum length for an interblock gap. This having been confirmed at or before position 316 at the front boundary FB23 of BLOCK3, the tape is ramped down to a stop at position 317.

At this point, a position value represented at position 319 is calculated by adding a value corresponding to half a minimum ga length to the reference value corresponding to the previously captured rear boundary RB22 of BLOCK2. The tape is moved in a reverse direction, ramping up to speed by position 318. Position 318 need not be a boundary, but should be behind position S19.

At position 319 the capture mode is activated so that the next detection at position 320 is a recapture of the rear boundary RB22 of BLOCK2. The position value need not be the same as that stored when this boundary RB22 was captured going forward, since the tape may have slipped relative to the barrel of the speed sensor 118 during the reversal of tape direction. However any errors induced by such slippage are cancelled by the rearward capture of RB22 at position 320.

The value corresponding to the capture at position 320 is used as the final reference position for the hitch operation. The tape is ramped down to a stop at position 321. When the next read command is received, forward motion of the tape is resumed with operational speed being attained at position 322.

The boundary capture mode is activated at position 323. Position 323 is the position attained when the value in the position indicator equals the last captured value corresponding to RB22 plus a tolerance offset, in this case one half a minimum gap length. The next boundary captured is the front boundary FB23 of BLOCK3 at position 324. Subsequently, BLOCK3 can be read until its rear boundary RB33 is captured at position 325. GAP3 is verified by position 326, and the tape stopped at position 327.

Positions 321–327, with respect to BLOCK3, correspond to positions 311–317, with respect to BLOCK2. Thus, it can be seen how the start-stop read procedure can be iterated.

A read with retry procedure incorporating a backspace operation, in accordance with the present invention, is illustrated in FIG. 4. This procedure involves reading BLOCK2 during a forward segment SEG41, backspacing over BLOCK2 during a reverse segment SEG42, and then rereading BLOCK2 during a forward segment SEG43. This procedure could be used when the read circuitry detects an error which cannot be corrected instream. The first read segment SEG41 is the same as read segment SEG31 in the hitch operation of FIG. 3.

Here, the start is at position 411, operational speed is attained at position 412, the capture mode is enabled at position 413, and the front boundary FB12 is captured at position 414, at which point the block read begins. Rear boundary RB22 is captured at 415, and the GAP2 verified by position 416.

A backspace command issued while or before the tape is stopped at position 417 initiates the backspace operation shown as segment SEG42. The backspace operation begins like the hitch operation. The tape ramps up to speed in reverse direction from position 417 to position 418. The capture mode is activated when, at position 419, the position indicator attains a value equal to the value at t he forward-going capture of the rear boundary RB22 at position 415 plus a value representing a tolerance offset. Rear boundary RB22 is captured at position 420.

Instead of ramping down to a stop at this point, as in a hitch operation, reverse tape motion continues so that front boundary FB11 of BLOCK2 can be reverse-captured at position 421. This capture is used as the reference point for the next operation, which, in the illustrated procedure, is a read. However, provided the boundaries for BLOCK1 are still stored, the next operation could be another backspace.

In the illustrated procedure, GAP1 is verified in reverse by position 422, and then the tape is ramped down to a stop at position 423. Alternatively, the verification can be omitted, since verification of GAPI has already been performed in the forward direction, and the effects of differential tape stretch can be estimated and offset mathematically. However, the stop position 423 would still have to permit ramping up to speed prior to the attainment of the next point at which the capture mode is to be activated.

Upon receipt of the next forward read command, a read operation represented by segment SEG43 is executed. The tape ramps up to speed by position 424 from stop position 423. At position 425, when the position indicator value equals the captured position value from front boundary FB12 position capture at position 421 less a tolerance offset representing about one half a minimum gap length, the capture mode is activated.

The remainder of the read operation of SEG43 replicates the read operation of SEG41. The front boundary FB12 of BLOCK2 is captured again in the forward direction at position 426, the block reread, the rear boundary RB22 captured at position 427, GAP2 verified by position 428, and the tape ramped down to a stop at position 429.

In the above procedures, the block-to-gap capture mode and the gap-to-block capture mode are switched on and off. For example, while the block-to-qap capture mode is inhibited, a detected block-to-gap boundary will not be stored. This switching is used to avoid false captures. The most common false captures involve confusing one block for another block. For example, while ramping down after reading a block, another block can be entered and even traversed before a stop is executed. By inhibiting captures until a position value guaranteed to be within the gap adjacent the block of interest, captures do not reflect the boundaries of an unintended block.

Accordingly, in the above procedures, captures are inhibited during ramp downs and ramp ups. Upon ramping up, the capture modes are not activated until the position indicator value represents that a point within the adjacent gap is guaranteed as long as any positioning errors are within tolerances.

This guaranteed position value is calculated to be the last captured value offset by one half a minimum gap length. The direction of the offset is opposed to the direction of tape movement, since the objective is to recapture the last captured boundary. In a system in which errors induced by direction reversals are not symmetric, the offset can be a fraction other than one half a minimum gap length.

Once a gap-to-block boundary is captured, the gap-to-block capture mode is generally inactivated until a gap is verified. Likewise, once a block-to-gap capture is made, the block-to-gap capture mode is inactivated until a gap is verified. This tactic avoids confusion as to which block is present and reduces vulnerability to noise.

The block-to-gap capture mode is activated at the same point as the gap-to-block capture mode, in the illustrated start-stop read and read with retry procedures of FIGS. 3 and 4. Alternatively, the block-to-gap capture mode can be activated at a later point, such as upon the recapture of the next gap-to-block boundary, i.e., as the gap-to-block capture mode is inhibited. I A third activation point for the block-to-gap capture mode is used in the procedure, represented in FIG. 5, applied to the abnormal case of a read of a block with a full width dropout D45. In this case, the block-to-gap capture mode is not activated until the boundary to be captured is approached so that the intervening dropout does not result in a capture.

The read operation begins as before, with read operation at SEG51 starting at position 511, ramping up to speed by 512, activating the capture mode at position 513, capturing front boundary FB12 at position 514 and beginning the read of BLOCK2.

When the dropout D45 is reached, the first dropout boundary DB24 is captured at position 515. The second dropout boundary DB52 is detected at position 516, terminating gap verification. Since the dropout D45 is not verified as an interblock gap, the gap-to-block capture mode is not reactivated. Under these conditions, the block-to-gap capture mode remains activated. That an error condition exists is confirmed by the fact that no postamble is detected.

Forward motion of the tape continues, with the second dropout boundary DB52 not being captured, and the remainder of BLOCK2 being read. The rear boundary RB22 of BLOCK2 is captured at position 517; GAP2 is verified by position 518, and the tape motion is stopped at position 519. The validity of the capture at position 517 can be confirmed by recognition of a postamble adjacent RB22.

The backspace operation depicted as SEG52 begins by ramping up to speed in the reverse direction by position 520, activating the gap-to-block capture mode at position 521 in response to the value of the position indicator, and recapturing RB22 at position 522.

In contrast to the prior procedures, the block-to-gap capture mode is not activated along with the gap-to-block capture mode, nor upon recapture of RB22. Instead, the block-to-gap capture mode is activated at position 523 when the position indicator attains a calculated value.

This value can be calculated as follows. The forward capture value of FB12 taken at position 514 is subtracted from the forward capture value of RB22 taken at position 517. This yields a value representing the length of BLOCK2. This length value is subtracted from the rearward capture value of RB22 taken at position 522. The difference is the position expected for FB12 in the absence of differential stretch errors. Added to this expected position is a tolerance, which can be a function of the calculated length, since differential stretch errors tend to correlate with block length.

When the value so calculated is attained by the position indicator, the block-to-gap capture mode is activated. Usually, this will result in the dropout being ignored and the next capture being of the desired front boundary FB12 at position 524. This last capture is then available or use as the reference position for the next procedure once GAPI is verified by position 525 and the tape stopped at position 526.

This full-width dropout procedure is one example of many procedures that can be adapted according to the situation as determined by an overall tape positioning strategy. The strategy can take into account abnormal situations as detected and indicated by error flags, missing preambles and postambles, unverified gaps, etc.

In any event, the subsequent forward operation will have available to it a reference position reflecting substantially only the error due to a single tape direction reversal. Thus, the system tolerances are not exceeded or unduly constrained by the accumulation of errors. As is apparent to those skilled in the art, many variations upon and modifications to the above-described embodiments are provided for by the present invention, the scope of which is limited only by the following claims.

What is claimed is:

1. A method of positioning a tape relative to a transducer head, said method comprising the steps of:
    moving said tape by said head in a forward direction a first time;
    capturing a tape position indicator value of a block-to-gap boundary;
    inhibiting boundary capturing while ramping down to stop;
    ramping the tape up to speed in the reverse direction;
    activating boundary capturing when said tape is within a predetermined value of said captured tape position indicator value of said block-to-gap boundary;
    capturing a position indicator value of a next-detected gap-to-block boundary whereby said position indicator value of said next-detected gap-to-block boundary substantially reflects only the error due to a single tape direction reversal;
    inhibiting capturing while ramping down to stop; and
    moving the tape in the forward direction a second time, activating boundary capturing when said tape is within a predetermined value of said captured tape position indicator value of said next-detected gap-to-block boundary, and positioning said next-detected gap-to-block boundary of said tape relative to said transducer head sufficient to essentially restrict position error to a differential stretch over the ramp up distance and a single tape reversal.

2. The method of claim 1 further comprising the step of:
    after capturing the position of said gap-to-block boundary, and before ramping down to a stop in the reverse direction, capturing the next-detected block-to-gap boundary.

3. A method of providing reference positions for more precise positioning of blocks of data stored on a tape relative to a read head of a tape drive system, said tape drive system being capable of transferring said tape in a forward direction so that said tape can be read, said tape drive system being capable of transferring said tape in a reverse direction so that said tape can be repositioned, said blocks of data being arranged serially along said tape, adjacent blocks being spaced by interblock gaps, said interblock gaps having a predetermined nominal minimum length, each block having an associated front boundary and an associated rear boundary said tape drive system having a position indicator for indicating position values relative to a physical position along the length of a tape, said position indicator being subject to errors induced in part during accelerations and decelerations of said tape during starts, stops and reversals of tape motion, said method comprising the steps of:

inhibiting boundary capture;
moving said tape in the reverse direction;
activating boundary capture when said position value of said position indicator is within a predetermined value of a captured position value and;
capturing at least one of said front and rear boundaries of a block for providing a reference position for more precise positioning of blocks of data stored on said tape relative to said read head of said tape drive system.

4. The method of claim 3 further characterized in that said at least one boundary is said front boundary.

5. The method of claim 3 further characterized in that said at least one boundary is said rear boundary.

6. The method of claim 5 further characterized in that said front boundary is also captured while the tape is moving in reverse.

7. The method of claim 5 further characterized in that said activating boundary capture is the step of enabling a gap-to-block boundary capture mode before capturing said rear boundary and while moving in the reverse direction within a gap adjacent said rear boundary.

8. The method of claim 7 further characterized in that said activating boundary capture is enabling a block-to-gap boundary capture mode at substantially the same time as said gap-to-block capture mode is enabled.

9. The method of claim 5 further comprising the following steps:

prior to the moving the tape in the reverse direction, moving the tape in the forward direction across said block; capturing the rear boundary of said block; verifying that the gap immediately adjacent said rear boundary is at least as long as a predetermined nominal minimum interblock gap; and reversing the direction of said tape; and while said tape is moving in said reverse direction, activating boundary capture comprises enabling a gap-to-block capture mode when said position indicator indicates a position guaranteed to be within said gap provided the total relative error in tape position values accumulated subsequent to said forward motion capture of said rear boundary is within predetermined tolerance limits.

10. The method of claim 9 further characterized in that said enabling occurs about when said position indicator attains a value corresponding to the position value at the time of said forward motion rear boundary capture plus an offset corresponding to one half of a predetermined nominal minimum gap length.

11. The method of claim 9 further comprising:
after capturing said rear boundary, enabling a block-to-gap capture mode; and
capturing said front boundary.

12. The method of claim 9 further comprising the steps of:

prior to the forward motion capture of said rear boundary, moving said tape in a forward direction within the gap immediately adjacent the front boundary of said block;
while in said front gap enabling a gap-to-block capture mode;
enabling a block-to-gap capture mode;
capturing the front boundary of said block;
capturing the rear boundary of said block;
calculating the block length from the position values corresponding to the two forward motion captures;
after said rearward motion capture of said rear boundary, traversing said block, and enabling a block-to-gap capture mode when the position indicator indicates a value corresponding to the value of said reverse motion capture of said rear boundary less the calculated length of said block and plus an offset corresponding to a predetermined tolerance; and
capturing said front boundary.

13. A tape drive system for reading information from a tape medium, said information being stored in a series of data blocks separated by interblock gaps, each block having an associated rear boundary, said interblock gaps having a predetermined nominal minimum length, said tape drive system comprising:

a read head;
drive means for transferring a tape across said read head, including means for transferring said tape in a forward direction and in a rearward direction, means for starting and stopping said tape, and means for increasing and decreasing the speed of said tape;
position indicator means for assigning position values reflecting changes in tape position relative to said head;
boundary capture means for capturing a boundary between a block and a gap, including means for capturing a boundary between a block and a gap while a tape is moving in a reverse direction;
controller means for controlling said drive means, said drive controller means being in communication with said position indicator and said boundary capture means so as to have access to current and stored position values;
capture inhibit means for being responsive to said drive controller means so that data blocks other than one being positioned around can be ignored while said tape is moving and not operable within a predetermined value of said captured boundary to prevent improper boundary capture during repositioning said tape relative to said rear head.

14. The system of claim 13 wherein said boundary capture means includes means for capturing a gap-to-block boundary while said tape is moving in the rearward direction.

15. The system of claim 14 wherein said capture inhibit means includes means for selectively inhibiting gap-to-block boundary capture and means for selectively inhibiting block-to-gap capture, said capture inhibit means being adapted for use while said tape is moving in the rearward direction as well as in the forward direction during positioning.

16. The system of claim 13 wherein said boundary capture means includes means for capturing a block-to-gap boundary while said tape is moving in the rearward direction.

17. The system of claim 13 wherein said boundary capture means includes means for capturing a block-to-gap boundary while said tape is moving in the forward direction.

18. The system of claim 17 wherein said boundary capture means includes means for capturing a gap-to-block boundary while said tape is moving in the forward direction, and said controller means includes means for calculating the length of a block from a stored position value representing the forward motion capture of a gap-to-block boundary and a stored position value representing the next forward motion capture of a block-to-gap boundary.

19. The system of claim 17 further comprising gap verify means for verifying that a gap meets a predetermine nominal minimum interblock gap length, said gap verify means being adapted to determine whether a gap meets said nominal minimum gap length.

* * * * *

UNITED STATES PATENT AND TRADEMARK OFFICE
CERTIFICATE OF CORRECTION

PATENT NO. : 4,821,129

DATED : 04/11/89

INVENTOR(S) : Bradfred W. Culp

It is certified that error appears in the above-identified patent and that said Letters Patent is hereby corrected as shown below:

Abstract, Line 1, "driven" should read -- drive--;

Column 2, Line 27, "acceleration" should read -- deceleration --;

Column 2, Line 55, "ar" should read -- are --;

Column 7, Line 25, "no new paragraph after "EFLAG output."" should read -- new paragraph --;

Column 8, Line 65, "B/G." should read -- B/G^.--;

Column 9, Line 23, "ga" should read -- gap --;

Column 10, Line 14, "t he (space between t and h)" should read -- the --;

Column 10, Line 29, "GAPI" should read -- GAP1--;

Column 10, Line 54, "block-to-qap" should read -- block-to-gap --;

Column 11, Line 24, "I A (delete "I" and start new paragraph with "A")" should read --(begin new paragraph)--;

Column 12, Line 13, "or use" should read -- for use --;

Column 12, Line 14, "GAPI" should read -- GAP1 --.

Signed and Sealed this
Twelfth Day of December, 1989

*Attest:*

JEFFREY M. SAMUELS

*Attesting Officer*   *Acting Commissioner of Patents and Trademarks*